United States Patent
Bellet et al.

(10) Patent No.: US 10,427,773 B2
(45) Date of Patent: Oct. 1, 2019

(54) STRUCTURAL ASSEMBLY FOR AN AIRCRAFT FUSELAGE WITH DOUBLE CURVATURE INCLUDING FRAMES WITH AN OPTIMIZED ORIENTATION

(71) Applicant: AIRBUS OPERATIONS (S.A.S.), Toulouse (FR)

(72) Inventors: Daniel Bellet, Saint-Lys (FR); Philippe Bernadet, Colomiers (FR)

(73) Assignee: Airbus Operations (S.A.S.), Toulouse (FR)

( * ) Notice: Subject to any disclaimer, the term of this patent is extended or adjusted under 35 U.S.C. 154(b) by 349 days.

(21) Appl. No.: 15/353,319

(22) Filed: Nov. 16, 2016

(65) Prior Publication Data
US 2017/0137106 A1 May 18, 2017

(30) Foreign Application Priority Data
Nov. 17, 2015 (FR) .................................. 15 61048

(51) Int. Cl.
| | |
|---|---|
| *B64C 1/06* | (2006.01) |
| *B64C 1/10* | (2006.01) |
| *B64C 1/12* | (2006.01) |
| *B64C 1/14* | (2006.01) |
| *B64C 1/36* | (2006.01) |
| *B64C 25/14* | (2006.01) |

(52) U.S. Cl.
CPC .............. *B64C 1/068* (2013.01); *B64C 1/061* (2013.01); *B64C 1/10* (2013.01); *B64C 1/12* (2013.01); *B64C 1/1492* (2013.01); *B64C 1/36* (2013.01); *B64C 25/14* (2013.01)

(58) Field of Classification Search
CPC ......... B64C 1/061; B64C 1/1476; B64C 1/18; B64C 25/04; B64C 1/06; B64C 1/064; B64C 1/065; B64C 1/068; B64C 1/069; B64C 1/10; B64C 1/12; B64C 1/1492; B64C 1/36; B64C 25/14; B64D 11/00; B64D 45/00
USPC ........................................................ 244/120
See application file for complete search history.

(56) References Cited

U.S. PATENT DOCUMENTS

| | | | |
|---|---|---|---|
| 8,915,470 B2 | 12/2014 | Bernadet et al. | |
| 9,387,919 B2 | 7/2016 | Guering | |
| 2013/0134259 A1* | 5/2013 | Lieven | B64C 25/20 244/102 A |

(Continued)

FOREIGN PATENT DOCUMENTS

| | | |
|---|---|---|
| EP | 2 574 543 A2 | 4/2013 |
| ES | 2 112 711 A1 | 4/1998 |

(Continued)

OTHER PUBLICATIONS

French Search Report for Application No. 1561048 dated Jul. 29, 2016.

*Primary Examiner* — Tien Q Dinh
*Assistant Examiner* — Steven J Shur
(74) *Attorney, Agent, or Firm* — Jenkins, Wilson, Taylor & Hunt, P.A.

(57) ABSTRACT

In order to allow an aircraft fuselage structure to provide optimum resistance to pressurization loads in a fuselage region with a double curvature, the fuselage structure includes a circumferential frame oriented so that the web of the circumferential frame has an orientation close to the local normal to the skin of the fuselage.

11 Claims, 4 Drawing Sheets

(56) References Cited

U.S. PATENT DOCUMENTS

2013/0146710 A1\* 6/2013 Bernadet ................ B64D 45/00
                                                        244/119
2013/0221156 A1\* 8/2013 Guering .................. B64C 1/061
                                                        244/119

FOREIGN PATENT DOCUMENTS

FR        2 983 825 A1    6/2013
WO   WO 2001/23254 A1    4/2001

\* cited by examiner

STRUCTURAL ASSEMBLY FOR AN AIRCRAFT FUSELAGE WITH DOUBLE CURVATURE INCLUDING FRAMES WITH AN OPTIMIZED ORIENTATION

CROSS-REFERENCE TO RELATED APPLICATION

This application claims priority to French Patent Application FR 15 61048 filed Nov. 17, 2015, the entire disclosure of which is incorporated by reference herein.

TECHNICAL FIELD

The present disclosure concerns a structural assembly intended to form at least a part of an aircraft fuselage and comprising a fuselage skin and circumferential frames. The disclosure herein more particularly concerns a structural assembly of this kind in which at least a portion of the fuselage skin has a double curvature. It must be understood by this that the portion of the skin is curved when it is seen in section both in a transverse plane and in an axial plane. The circumferential frames concerned are those to which the double curvature portion of the skin is fixed.

The disclosure herein also concerns an aircraft including a structural assembly of this kind. The latter may notably form part of a nose section of the aircraft.

BACKGROUND

The structure of the fuselage of an aircraft generally includes criss-crossing circumferential frames of globally circular shape lying in planes transverse to the axial direction of the aircraft and longitudinal stringers. A structure of this kind makes it possible to impart a stable geometry to the fuselage skin.

A notable function of the circumferential frames is to resist the loads induced by the pressurization of the cockpit and the cabin of the aircraft. To this end, the frames typically have a T-shape, I-shape, L-shape or other shape section and therefore comprise a web and a flange substantially orthogonal to the web. The fuselage skin is fixed to this flange, also referred to as the "chord member".

In the greater part of the fuselage of aircraft of known type, the skin is of circular cylindrical general shape with the result that the web of each circumferential frame is substantially orthogonal to the skin. This configuration is the optimum in terms of resistance to the loads induced by pressurization.

On the other hand, in the nose section and in the tail section of the aircraft, the fuselage skin has a double curvature with the result that the respective webs of the circumferential frames in these regions of the aircraft are not orthogonal to the fuselage skin.

Because of this, this type of fuselage structure is not the optimum in terms of resistance to pressurization forces.

SUMMARY

An object of the disclosure herein is to provide a simple, economical and effective solution to this problem.

To this end, a structural assembly is disclosed herein, intended to form a part of an aircraft fuselage, and including a fuselage skin having a double curvature, and circumferential frames that include a web and a flange substantially orthogonal to the web and to which the fuselage skin is fixed.

According to the disclosure herein, the circumferential frames include at least one first circumferential frame having a lower extremity and an upper extremity and conformed so that a first virtual straight line half-segment, which passes through the web and originates from the middle of a first virtual straight line segment connecting the lower extremity to the upper extremity, extending orthogonally to the first virtual straight line segment, intersects the fuselage skin at a point at which the first virtual straight line half-segment is substantially orthogonal to the fuselage skin.

This geometrical property of the first circumferential frame makes it possible to guarantee that at least a portion of the web of the first circumferential frame, located at the level of the point of intersection of the first virtual straight line half-segment with the fuselage skin, extends locally in a direction close to the normal to the fuselage skin. The first circumferential frame therefore offers an optimum resistance to the forces induced by the pressurization of the fuselage of the aircraft.

Preferably, the web of the first circumferential frame is inscribed in a plane at an angle strictly between 0 and 45 degrees to a transverse plane.

Preferably, the lower extremity and the upper extremity of each first circumferential frame are situated on the same lateral side of the structural assembly.

Preferably, the web of the first circumferential frame has a portion centered relative to the point of intersection of the first virtual straight line half-segment and the fuselage skin, which portion extends everywhere in a direction at an angle less than 20 degrees to the local normal to the fuselage skin, and has a circumferential extent exceeding 10% of the circumferential extent of the first circumferential frame of which it forms part.

Preferably, the circumferential frames further include at least one second circumferential frame extending symmetrically with respect to the first circumferential frame relative to a vertical median plane of the structural assembly.

In one preferred embodiment of the disclosure herein, the lower extremity of the first circumferential frame is connected to a landing gear well structure.

Alternatively, the respective lower extremities of the first and second circumferential frames may be joined together by connectors such as appropriate stringers.

Preferably, the structural assembly further includes a lower windshield frame section intended to support an aircraft cockpit windshield and the upper extremity of the first circumferential frame is connected to the lower windshield frame section.

The structure assembly preferably includes a one-piece upper portion integrating a part of the fuselage skin and a structure including the lower windshield frame section and an upper windshield frame section, uprights, stringers, and an upper extremity portion of the first circumferential frame. In this case the lower windshield frame section, the upper windshield frame section and the uprights delimit the windshield.

Preferably, all the stringers of the upper portion and the lower windshield frame section, the upper windshield frame section and the uprights each include a web having a third extremity and an opposite fourth extremity and are each conformed or configured so that a corresponding second virtual straight line half-segment which passes thorough the web and through the middle of a corresponding second virtual straight line segment connecting the third extremity to the fourth extremity and extends orthogonally to the second virtual straight line segment intersects the fuselage skin at a point at which the second virtual straight line half-segment is substantially normal to the fuselage skin.

The disclosure herein also concerns an aircraft including a structural assembly of the type described above.

In one preferred embodiment of the disclosure herein the aircraft includes a nose section that includes the structural assembly.

BRIEF DESCRIPTION OF THE DRAWINGS

The disclosure herein will be better understood and other details, advantages and features thereof will become apparent on reading the following description given by way of nonlimiting example and with reference to the appended drawings, in which.

DETAILED DESCRIPTION

Figure 1:
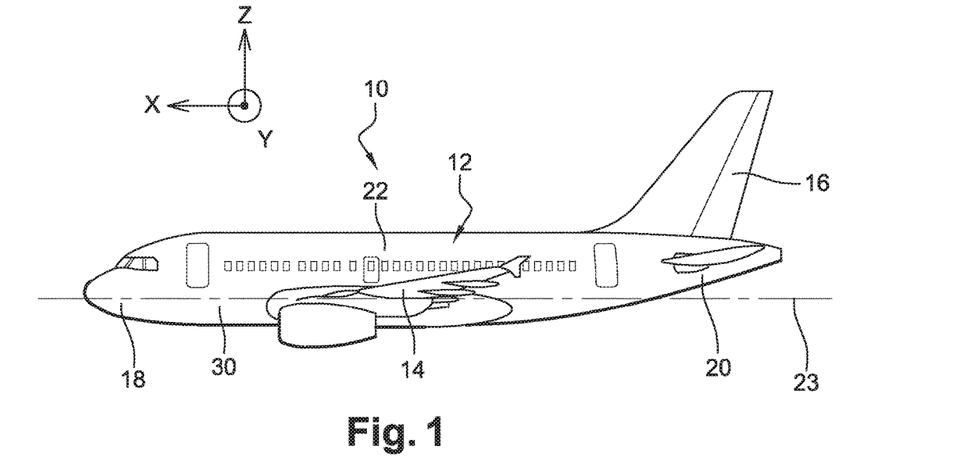
FIG. 1 is a diagrammatic side view of an aircraft according to a preferred embodiment of the disclosure herein.

FIG. 1 is a general view of an aircraft 10 comprising a fuselage 12, wings 14 and a tail assembly 16. The fuselage 12 typically includes a nose section 18, a tail section 20 and a middle section 22 of substantially circular cylindrical general shape arranged between the nose section 18 and the tail section 20 and defining a longitudinal axis 23 of the aircraft.

In the following description, X refers to the longitudinal axial direction of the aircraft, Z refers to the vertical direction (as defined when the aircraft is parked on a horizontal surface) and Y refers to the transverse direction orthogonal to the previous two directions. The directions X and Y define so-called "horizontal" planes with respect to the orientation of the aircraft when the latter is parked on the ground.

FIGS. 2 through 6 show to a larger scale a structural assembly 24 forming a part of the nose section 18 and comprising in a general way a plurality of circumferential frames 26 and stringers 28 together with a fuselage skin 30 fixed to the circumferential frames and the stringers. In the conventional manner, the fuselage skin 30 has a double curvature.

Each of the circumferential frames 26 and the stringers 28 includes a web 32, 34 and a flange 36, 38 substantially orthogonal to the web 32, 34 extending from one edge of the web and to which the fuselage skin 30 is attached. The circumferential frames 26 and the stringers 28 therefore have a T-shape section. Of course, without departing from the scope of the disclosure herein, these elements may instead comprise a heel on the other edge of the web and/or an intermediate stringer connected to a middle portion of the web. Moreover, the flange and/or where applicable the heel and/or the intermediates stringer may be symmetrical with respect to the web or not. The section of the circumferential frames 26 and the stringers 28 can therefore be I-shaped, L-shaped or some other shape.

To make it possible to see the respective webs 32, 34 of the circumferential frames 26 and the stringers 28, the flanges 36, 38 cannot be seen in FIGS. 2 through 5, 7 and 8, and only a rear portion of the fuselage skin 30 can be seen in these figures.

Some of the circumferential frames 26, referred to hereinafter as the "first circumferential frames 40A", have a lower end 42A and an upper end 44A and are therefore arcuate.

In accordance with one particular feature of the disclosure herein, the first circumferential frames 40A are shaped so that their respective webs 32 lie in respective planes 46A (FIG. 5) that are not orthogonal to the longitudinal axis 23. To be more precise, each of the first circumferential frames 40A is shaped so that a corresponding first virtual straight line half-segment 48 that passes through the web 32 of the frame and starts from the middle 50 of a first virtual straight line segment 52 connecting the lower end 42A to the upper end 44A of the frame, extending orthogonally to the first virtual straight line segment 52, intersects the fuselage skin 30 at a point 54 at which the first virtual straight line half-segment 48 is substantially orthogonal to the fuselage skin 30. By "substantially orthogonal" is meant orthogonal to within a tolerance of +/−10 degrees and preferably +/−5 degrees. Given the degree of curvature of the fuselage skin 30, the plane 46A of the web 32 of each first circumferential frame 40A is at an angle θ strictly between 0 and 45 degrees to a transverse plane 55 (i.e. a plane orthogonal to the longitudinal direction X). The angle θ is defined between vectors V1 and V2 normal to the planes 46A and 55, respectively (FIG. 5).

Figure 5:
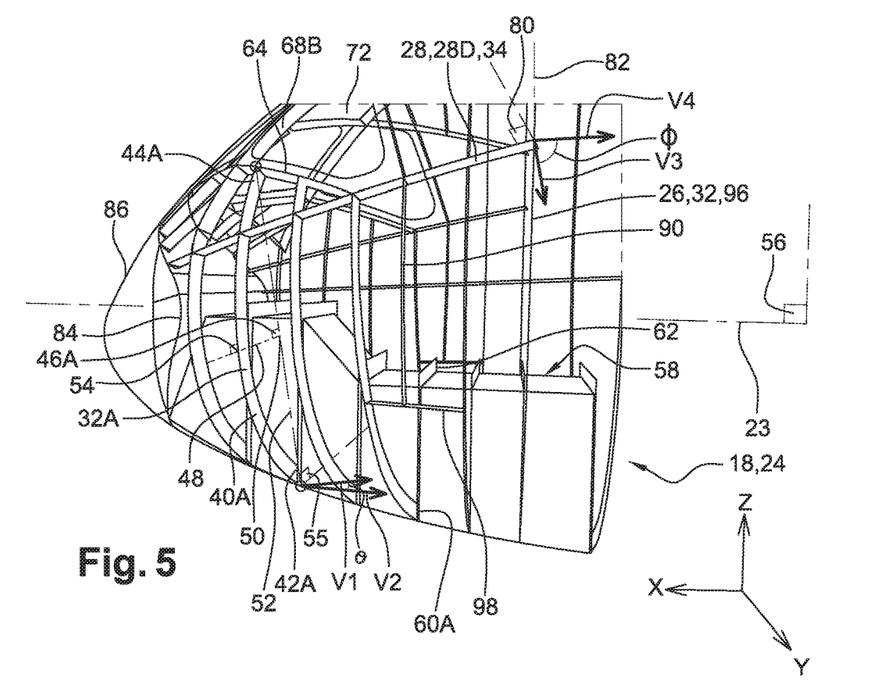
FIG. 5 is a diagrammatic partial perspective view of the structural assembly from FIG. 2, seen from the rear.

This geometrical property of the first circumferential frames 40A makes it possible to guarantee that at least a portion 32A of the web 32 of each first circumferential frame 40A centered on the point 54 extends locally with an orientation close to the normal to the fuselage skin 30 (FIG. 5). The portion 32A of the web 32 therefore preferably extends everywhere in a direction at an angle less than 20 degrees to the local normal to the fuselage skin 30, this angle preferably being less than 10 degrees. Moreover, the portion 32A preferably has a circumferential extent greater than 10% of the circumferential extent of the first circumferential frame 40A of which it forms part.

In practice, the curvature of the fuselage is generally moderately pronounced, with the result that the circumferential extent of the aforementioned portion 32A of the web 32 of each first circumferential frame 40A may be greater than 25%, or even 50%, of the circumferential extent of the corresponding first circumferential frame 40A.

More generally, the whole of the web 32 of each first circumferential frame 40A therefore has everywhere an orientation relatively close to the local normal to the fuselage skin 30, unlike known type fuselage structures.

This configuration of the first circumferential frames 40A offers optimum resistance to the forces induced by the pressurization of the fuselage of the aircraft.

Figure 3:
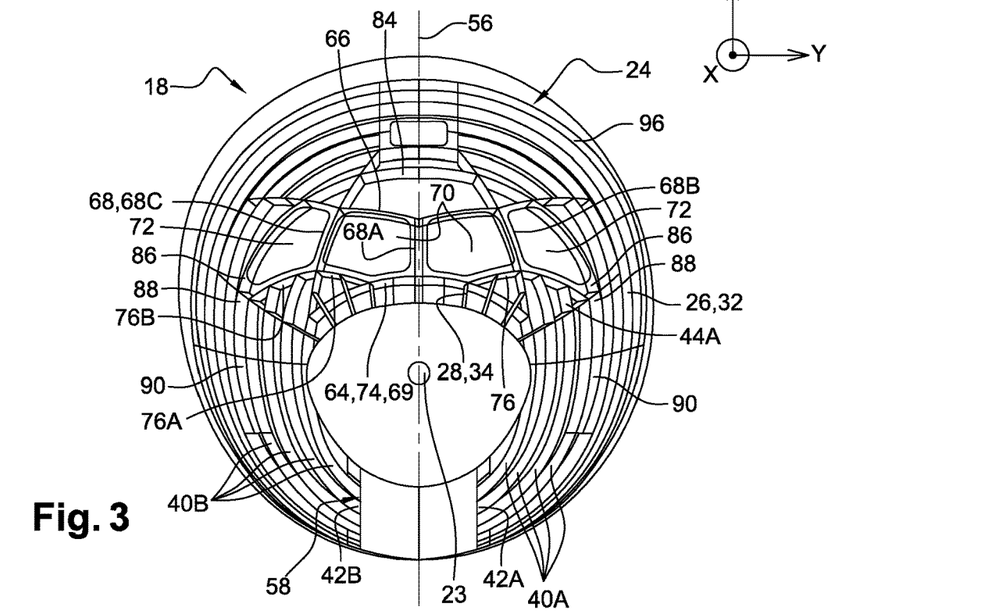
FIG. 3 is a diagrammatic front view of the structural assembly from FIG. 2.
Figure 6:
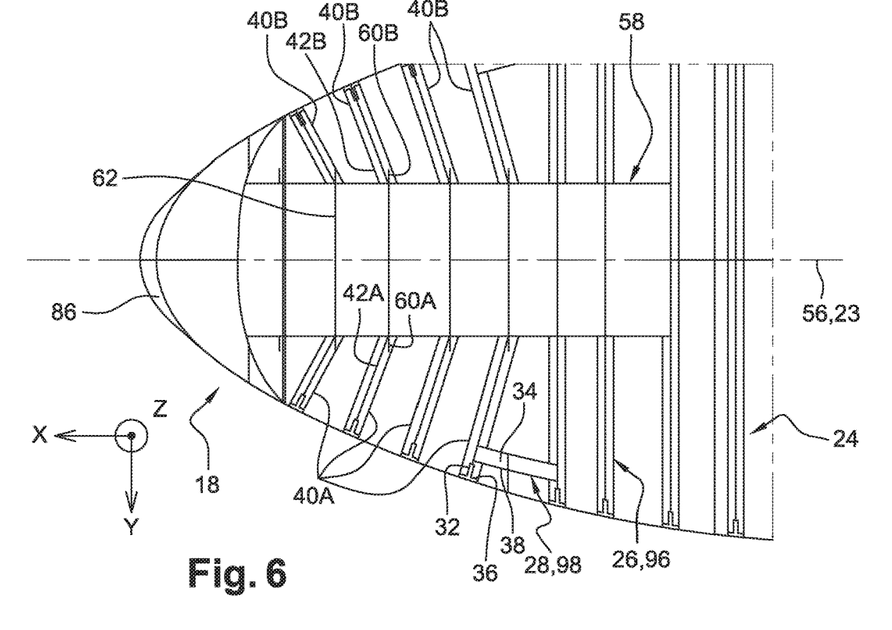
FIG. 6 is a diagrammatic partial view of the structural assembly from FIG. 2 in section on a horizontal plane passing through the axis of the aircraft.

As is more clearly apparent in FIGS. 3 and 6, the structural assembly 24 includes second circumferential frames 40B arranged symmetrically to the first circumferential frames 40A with respect to a vertical median plane 56 of the structural assembly 24, which is also a vertical median plane of the aircraft, and which is defined as being a plane passing through the longitudinal axis 23 and parallel to the longitudinal direction X and the vertical direction Z. The second circumferential frames 40B therefore have the same properties as the first circumferential frames 40A.

In the example shown, the nose section 18 includes a front landing gear well 58 (FIGS. 4 through 6) arranged in a position relatively close to the front end of the aircraft, under the cockpit. The lower end 42A of each first circumferential frame 40A is connected to a lower end 60A of a corresponding rib 62 that is part of the structure of the landing gear well 58. In an analogous manner, the lower end 42B of each second circumferential frame 40B is connected to a lower end 60B of the corresponding rib 62 (FIG. 6).

Alternatively, and notably when the front landing gear well is at a position relatively rearward of the cockpit, the respective lower ends of some or all of the first circumferential frames 40A may be connected to the respective lower ends of some or all of the second circumferential frames 40B, typically by connectors such as appropriate stringers.

In both cases, it should be noted that the lower end 42A and the upper end 44A of each first circumferential frame 40A are situated on the same lateral side of the structural assembly 24. The same obviously applies to the second circumferential frames 40B.

Figure 2:
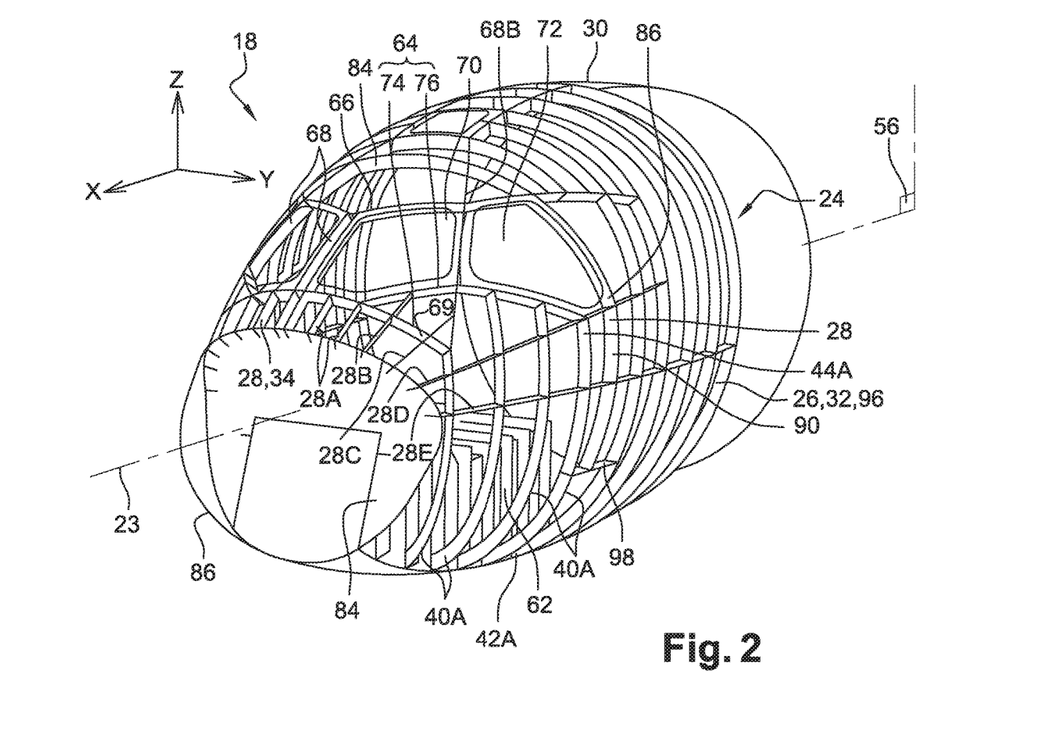
FIG. 2 is a diagrammatic perspective view of a structural assembly forming a part of a nose section of the aircraft from FIG. 1, seen from the front.

In the embodiment shown, the structural assembly 24 further includes a lower windshield frame section 64 and an upper windshield frame section 66 as well as uprights 68 that connect them together (FIGS. 2 and 3). In a manner that is known in itself these elements 64, 66, 68 are intended to support the windshield of the aircraft. Like the stringers 28, these elements 64, 66, 68 have a T-shaped or I-shaped section and therefore comprise a web 69 and at least one flange (not visible in the figures) orthogonal to their web and to which the fuselage skin 30 is attached.

By way of example, there are three uprights 68, namely a central upright 68A and two lateral uprights 68B, 68C symmetrical to each other with respect to the vertical median plane 56 (FIG. 3).

The structural assembly therefore delimits four locations for windows intended to form the windshield, namely two median locations 70 separated from each other by the central upright 68A and symmetrical to each other with respect to the vertical median plane 56 and two lateral locations 72 each separated from the adjacent central location 70 by one of the lateral uprights 68B, 68C and also symmetrical to each other with respect to the vertical median plane 56.

Still by way of example, the lower windshield frame section 64 includes an arcuate median branch 74 centered with respect to the vertical median plane 56 and two lateral branches 76 symmetrical to each other with respect to the vertical median plane 56 and extending rearwards from the median branch 74, for example from two regions of the median branch 74 each substantially halfway between a corresponding lateral end of the median branch 74 and the vertical median plane 56 (FIGS. 2 and 3).

Each of the lateral branches 76 is formed for example of two segments 76A, 76B at a non-zero angle to each other (FIG. 3).

The stringers 28 of the structural assembly 24 have a primarily longitudinal orientation. This means that the web 34 of each of these stringers 28 lies in a respective plane 80 at an angle φ strictly greater than 45 degrees to a transverse plane 82. The angle φ is defined between vectors V3 and V4 normal to the planes 80 and 82, respectively (FIG. 5).

Figure 4:
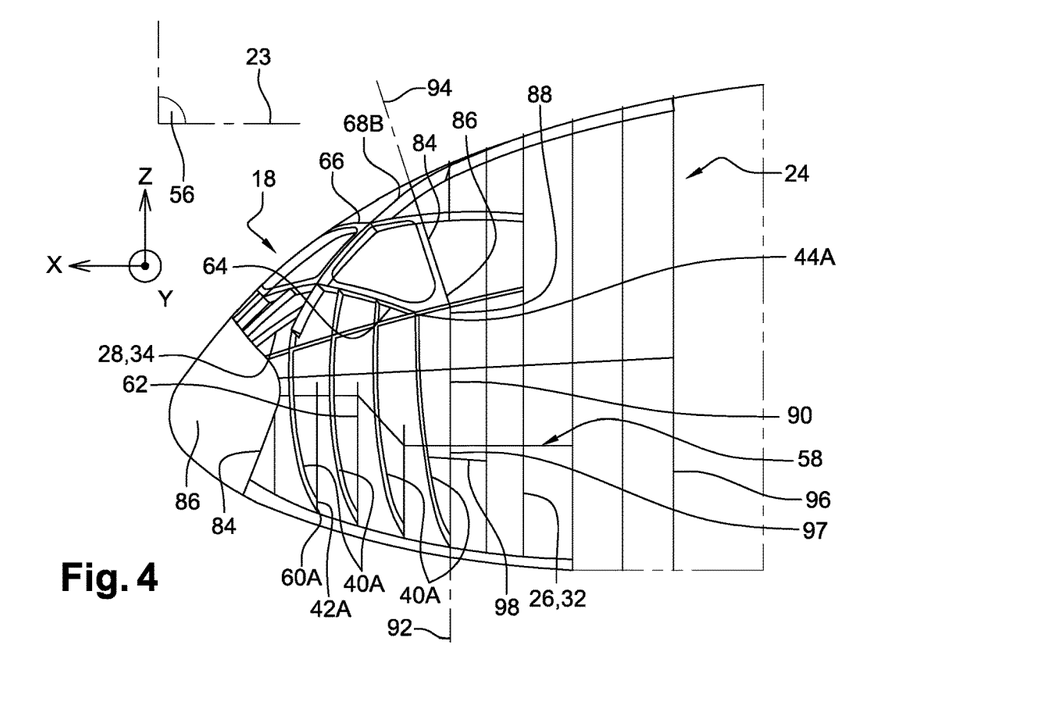
FIG. 4 is a diagrammatic side view of the structural assembly from FIG. 2.

Some of the stringers 28 extend rearwards from a front bulkhead 84 to which a radome 86 of the aircraft is attached (FIG. 4). As FIG. 2 shows, starting from the vertical median plane 56 and moving away therefrom toward one side of the aircraft, there are first encountered two stringers 28A that terminate towards the rear at the level of the median branch 74 of the lower windshield frame section 64, followed by a stringer 28B that extends rearwards as far as the corresponding lateral branch 76 of the lower windshield frame section 64, followed by a stringer 28C that extends rearwards as far as the corresponding lateral upright 68B, followed by two stringers 28D and 28E that extend rearwards beyond the lower windshield frame section 64 and the first circumferential frames 40A.

Moreover, the structural assembly 24 includes a third circumferential frame 84 which delimits a rear side of each of the lateral locations 72 of the windshield (FIGS. 2 through 4). This third circumferential frame 84 is an open frame centered with respect to the vertical median plane 56. It therefore has two lower ends 86 by which it is connected to the respective upper ends 88 of two fourth circumferential frames 90, each of arcuate shape, arranged symmetrically to each other with respect to the vertical median plane 56. Still by way of example, the respective webs of the fourth circumferential frames 90 are inscribed in a transverse plane 92 (FIG. 4) while the web of the third circumferential frame 84 is inscribed in a plane 94 inclined to the vertical direction.

The structural assembly 24 further includes fifth circumferential frames 96 arranged to the rear of the frames described above. These fifth circumferential frames 96 are of a conventional type, i.e. of closed annular shape, and their respective webs lie in transverse planes.

The stringers 28 include for example two stringers 98 (FIGS. 2, 4 and 5) respectively connecting those of the first and second circumferential frames 40A, 40B that are situated at the greatest distance to the rear to that of the fifth circumferential frames 96 that is situated farthest forward. The respective lower ends 97 of the fourth circumferential frames 90 are for example connected to respective stringers 98.

In the preferred embodiment shown in the figures, the structural assembly 24 includes a one-piece upper portion 100 (FIGS. 7 and 8) incorporating a part of the fuselage skin 30 (not visible in these figures) and a structure comprising all of the stringers 28 situated in the corresponding region of the structural assembly 24 as well as the lower windshield frame section 64, the upper windshield frame section 66 and the uprights 68. The stringers 28 concerned are the stringers 28A-28C as well as a front portion 101 of the stringer 28D.

Figure 7:
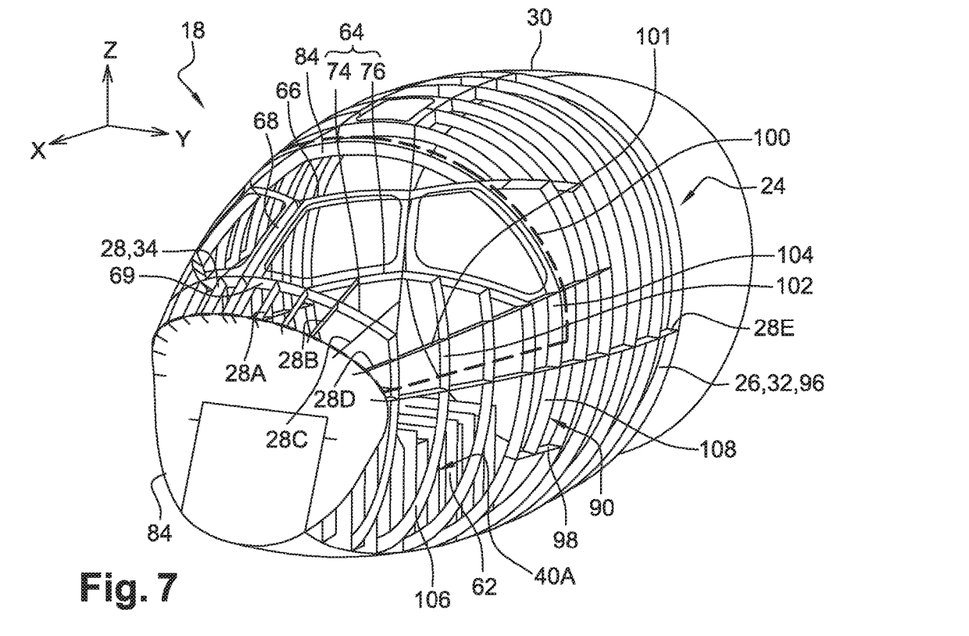
FIG. 7 is a view similar to FIG. 2 showing an upper portion made in one piece and forming part of the structural assembly.
Figure 8:
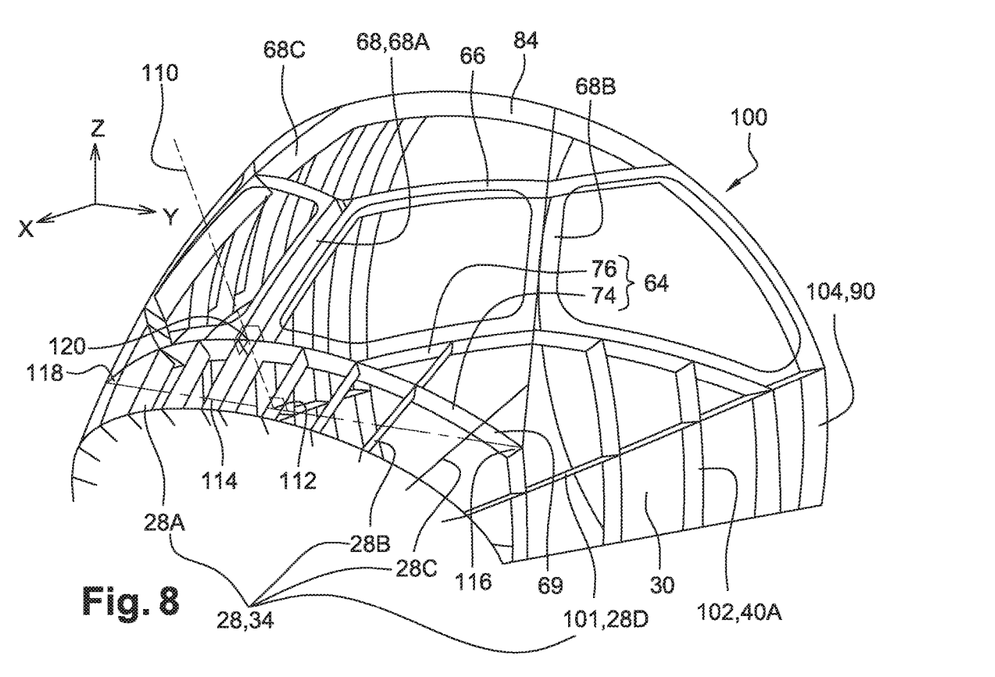
FIG. 8 is a diagrammatic perspective view to a larger scale of the upper portion of the structural assembly.

The structure of the upper portion 100 further includes an upper end portion 102 of each of the first and second circumferential frames 40A, 40B and an upper end portion 104 of each of the fourth circumferential frames 90. Each of the first and second circumferential frames 40A, 40B therefore includes a lower portion 106 independent of the upper portion 100 and the corresponding upper portion 102 integral with the upper portion 100. In an analogous manner, each of the four circumferential frames 90 includes a lower portion 108 independent of the upper portion 100, and the corresponding upper portion 104 integral with the upper portion 100.

The stringers 28 of the upper portion 100 as well as the lower windshield frame section 64, the upper windshield frame section 66 and the uprights 68 all have a geometrical property analogous to that of the first circumferential frames 40A. To be more precise, as shown in FIG. 8 for example, where the median branch 74 of the lower windshield frame section 64 is concerned, each of the structural elements is configured so that a corresponding second virtual straight line half-segment 110 which passes through the web 34, 69 of the element and the middle 112 of a corresponding second virtual straight line segment 114 connecting a third edge 116 of the web of the element to an opposite fourth edge 118 of the web of the element, and which is orthogonal to the second virtual straight line segment 114, intersects the fuselage skin at a point 120 at which the second virtual straight line half-segment 110 is substantially normal to the fuselage skin.

Generally speaking, the conformation of the aforementioned structural elements of the upper portion 100 imparts to them a better resistance to pressurization loads and moreover makes it possible to facilitate the manufacture of the one-piece upper portion 100.

This configuration of the upper portion 100 is notably made possible by the conformation of the first and second circumferential frames 40A, 40B according to the disclosure herein. In fact, the position of the upper end 44A of each of these frames is not imposed by the axial position of their lower end 42A as in fuselages of known type, but to the contrary may be chosen as a function of the configuration of the aforementioned structural elements of the upper portion 100 to which the frames 40A, 40B must be connected, independently of the axial position of the lower end 42A of each of these frames 40A, 40B, which may be defined as a function of other technical constraints such as the position of the ribs 62 in the landing gear well 58 where necessary.

The disclosure herein has been described above in its application to an aircraft nose section, but may advantageously be applied to other parts of the fuselage of an aircraft having a double curvature, for example a tail section.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A structural assembly for forming a part of an aircraft fuselage, comprising:
a fuselage skin having a double curvature; and
circumferential frames that comprise a web and a flange substantially orthogonal to the web and to which the fuselage skin is fixed,
wherein the circumferential frames comprise at least one first circumferential frame having a lower extremity and an upper extremity and conformed so that a first virtual straight line half-segment, which passes through the web and originates from a middle of a first virtual straight line segment connecting the lower extremity to the upper extremity, extending orthogonally to the first virtual straight line segment, intersects the fuselage skin at a point at which the first virtual straight line half-segment is substantially normal to the fuselage skin.

2. The structural assembly according to claim 1, wherein the web of the first circumferential frame is inscribed in a plane at an angle strictly between 0 and 45 degrees to a transverse plane.

3. The structural assembly according to claim 1, wherein the lower extremity and the upper extremity of the first circumferential frame are situated on a same lateral side of the structural assembly.

4. The structural assembly according to claim 1, wherein the web of the first circumferential frame has a portion centered relative to a point of intersection of the first virtual straight line half-segment and the fuselage skin, wherein the portion extends at an angle less than 20 degrees to a local normal to the fuselage skin and has a circumferential extent exceeding 10% of a circumferential extent of the first circumferential frame.

5. The structural assembly according to claim 1, wherein the circumferential frames further include at least one second circumferential frame extending symmetrically with respect to the first circumferential frame relative to a vertical median plane of the structural assembly.

6. The structural assembly according to claim 1, wherein the lower extremity of the first circumferential frame is connected to a landing gear well structure.

7. The structural assembly according to claim 1, further comprising a lower windshield frame section to support an aircraft cockpit windshield and in which the upper extremity of the first circumferential frame is connected to the lower windshield frame section.

8. The structural assembly according to claim 7, comprising a one-piece upper portion integrating a part of the fuselage skin and a structure comprising the lower windshield frame section and an upper windshield frame section, uprights, stringers, and an upper extremity portion of the first circumferential frame, and in which the lower windshield frame section, the upper windshield frame section and the uprights delimit the aircraft cockpit windshield.

9. The structural assembly according to claim 8, wherein all the stringers of the upper portion and the lower windshield frame section, the upper windshield frame section and the uprights each comprising a second web having a third extremity and an opposite fourth extremity and are each conformed so that a corresponding second virtual straight line half-segment, which passes thorough the web and through a middle of a corresponding second virtual straight line segment connecting the third extremity to the fourth extremity and extends orthogonally to the second virtual straight line segment, intersects the fuselage skin at a second point at which the second virtual straight line half-segment is substantially normal to the fuselage skin.

10. An aircraft comprising a structural assembly forming a part of a fuselage of the aircraft, the structural assembly comprising:
a fuselage skin having a double curvature, and
circumferential frames that comprise a web and a flange substantially orthogonal to the web and to which the fuselage skin is fixed,
wherein the circumferential frames comprise at least one first circumferential frame having a lower extremity and an upper extremity and conformed so that a first virtual straight line half-segment, which passes through the web and originates from a middle of a first virtual straight line segment connecting the lower extremity to the upper extremity, extending orthogonally to the first virtual straight line segment, intersects the fuselage skin at a point at which the first virtual straight line half-segment is substantially normal to the fuselage skin.

11. The aircraft according to claim 10, including a nose section that comprises the structural assembly.

\* \* \* \* \*